June 10, 1930.  C. H. WILSON  1,762,497
AUTOMATIC HARDNESS TESTER
Filed Aug. 12, 1926   3 Sheets-Sheet 1

June 10, 1930. C. H. WILSON 1,762,497
AUTOMATIC HARDNESS TESTER
Filed Aug. 12, 1926 3 Sheets-Sheet 2

June 10, 1930.  C. H. WILSON  1,762,497
AUTOMATIC HARDNESS TESTER
Filed Aug. 12, 1926   3 Sheets-Sheet 3

INVENTOR
Charles H. Wilson,
BY
Harold O. Penney,
ATTORNEY.

Patented June 10, 1930

1,762,497

UNITED STATES PATENT OFFICE

CHARLES H. WILSON, OF PELHAM, NEW YORK, ASSIGNOR TO WILSON-MAEULEN COMPANY, INC., OF NEW YORK, N. Y., A CORPORATION OF NEW YORK

AUTOMATIC HARDNESS TESTER

Application filed August 12, 1926. Serial No. 128,853.

This invention relates to machines or apparatus for testing the hardness of articles and the like of metal and other material and more particularly to improvements in hardness testers of the general type shown in United States Patents Nos. 1,516,207 and 1,516,208 issued Nov. 18, 1924, to S. P. Rockwell for Hardness testing machines, though it is noted that the invention in all its aspects is not limited to machines of this particular type, nor in some respects even to hardness testers.

One object of the invention is to provide an apparatus or machine of this kind requiring less skill in operation than heretofore so that very unskilled persons may operate it satisfactorily.

Another object of the invention is to provide an apparatus or device of this kind in which substantially all of the operations are automatically performed except reading the indicator and placing the article to be tested upon the support.

Another object of the invention is to provide an apparatus or device of this kind which is power operated and is therefore less physically and mentally tiring to the operator than when hand operated.

Other objects of the invention are to improve generally the simplicity, speed, accuracy and efficiency of such devices and to provide a device or apparatus of this kind which is speedy, accurate, economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved automatic hardness testing machine which, briefly stated includes a frame carrying a movable pressure or engagement device and an anvil movable by suitable mechanism toward said device to bring the piece to be tested into contact with said device to raise a minor load connected to said device and to an indicator.

An automatic control means causes said mechanism to move the anvil toward the device until means actuated by the movement of the minor load causes a control means to disable said mechanism thus to stop the test piece; while means set in operation by said control means when said mechanism is thus disabled causes a major load to press on said device causing the device to make an indentation in accordance with the hardness of the test piece, and then to be removed therefrom and to cause said control means to cause said mechanism to move the anvil away from the engagement device, whereupon means actuated by the anvil on restoration causes said control means to disable said mechanism and bring the anvil to rest.

Said slight movement of said engagement device is measured by said indicator in terms of hardness.

In the accompanying drawing, showing by way of example, one of many possible embodiments of the invention.

Figure 2:
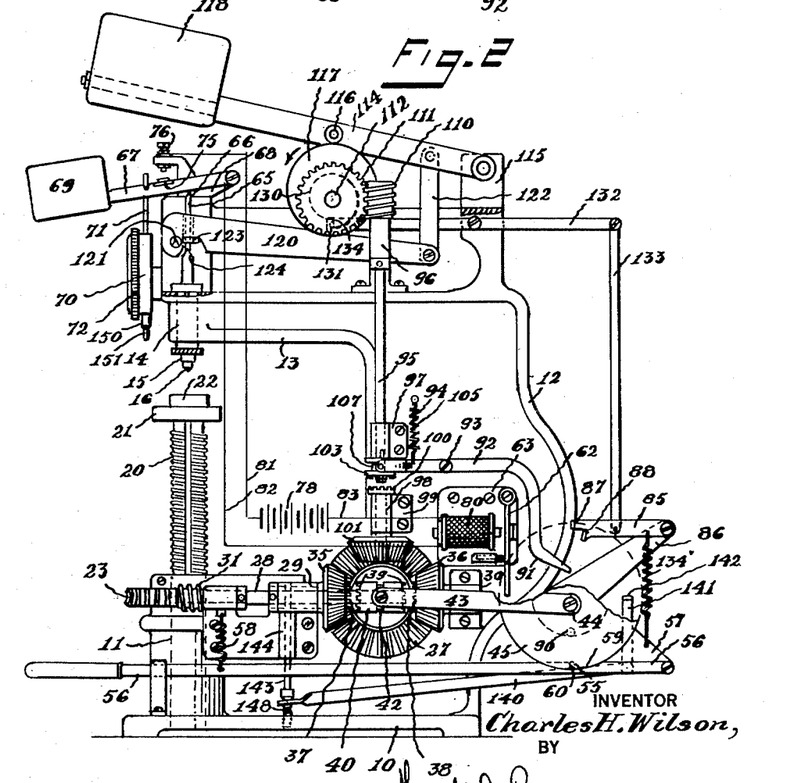
Fig. 2 is a side elevation showing one side of the machine.

The various mechanisms of my improved hardness testing machine are carried on a frame comprising a base 10 having a vertical lower opening 11 (Fig. 2) at one end, a standard 12 at the other end of the base, and an arm 13 on said standard disposed over the base and provided with an upper opening 14 alined with the opening 11 of the base.

A pressure rod or engagement device 15 vertically movable for limited movement in said upper opening is provided with testing point 16 which may, if desired, be similar to the hardness testing point show in my United States Patent No. 1,571,310 issued Feb. 2, 1926, for Penetrator for testing penetrating hardness.

An elevating screw 20 in said lower opening 11 is provided at its upper end with an anvil or test piece support 21 adapted to receive the test piece 22 to be tested. A threaded worm wheel 23 on said screw resting on the base is adapted when rotated to raise said screw to bring the test piece 22 to said point 16 substantially as shown and described in said Rockwell patents.

Figure 1:
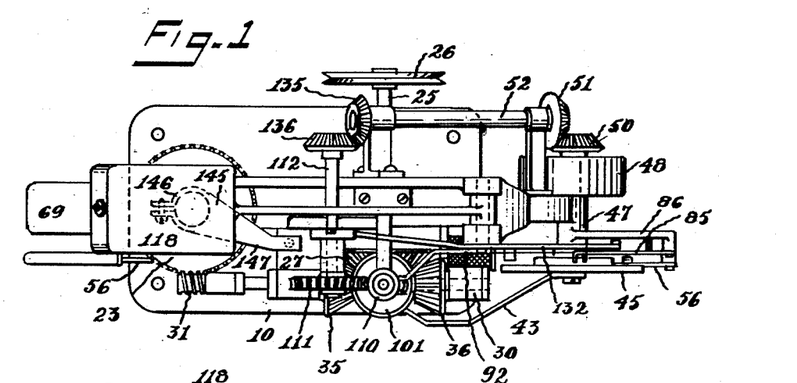
Fig. 1 is a plan of the machine.

A drive shaft 25 (Fig. 1) rotatably mounted transversely of said base carrying fast thereon a pulley 26 for receiving a belt by which the drive shaft may be rotated, carries also a driving bevel gear 27 on the end opposite to said pulley and near a horizontal worm shaft 28 disposed substantially tangential to said worm wheel 23 and rotatably carried in bearing brackets 29 and 30 mounted on the side of said base.

A worm 31 fast on said worm shaft engages said worm wheel.

Raising and restoring mitre pinions 35 and 36 loose on said worm shaft in mesh with said driving gear are provided with inwardly pointing clutch teeth 37 and 38 adapted to be engaged by clutch teeth 39 of a double throw horizontal clutch sleeve 40 on said worm shaft 28 and constrained to rotate therewith and slidable toward either of said pinions 35, 36 for engaging the teeth of the pinions, whereby said worm shaft may be rotated in either direction and the anvil raised or lowered.

Figure 3:
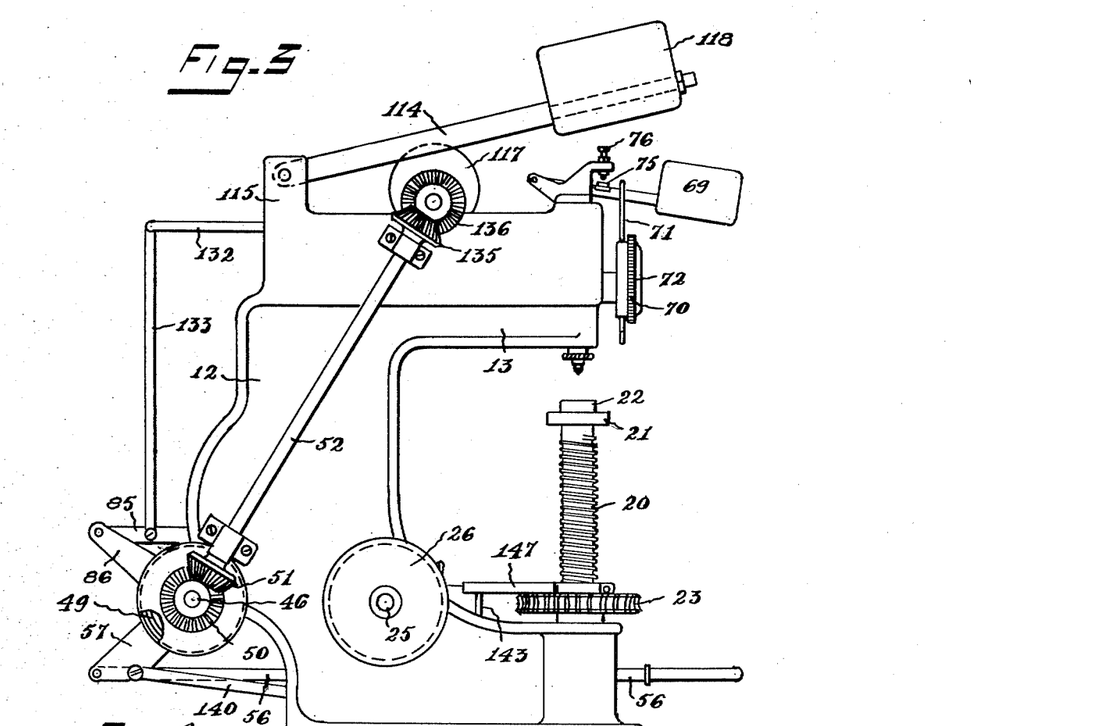
Fig. 3 is a side elevation showing the opposite side of the machine.
Figure 4:
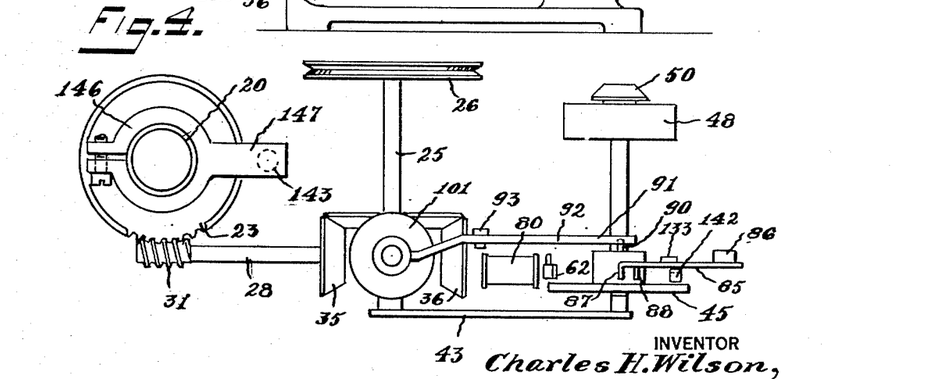
Fig. 4 is a somewhat diagrammatic plan showing the relation of certain parts of the machine.
Figure 5:
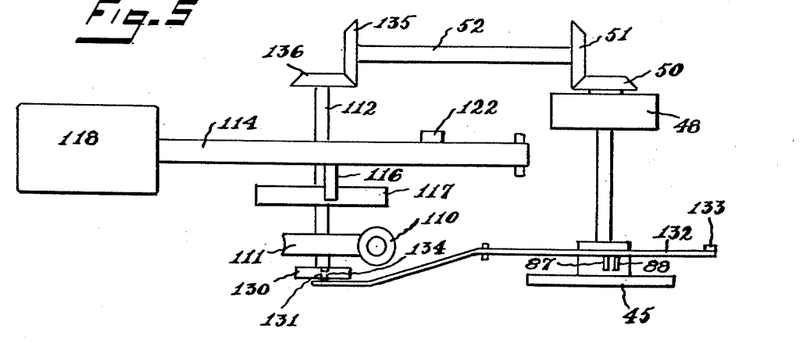
Fig. 5 is a similar plan showing the relations of other parts.

A yoke 42 loosely mounted in a groove around said sleeve is connected by a link 43 with a crank 44 of a crank wheel 45 carried fast on a shaft 46 (Fig. 3) rotatable in a bearing 47 (Fig. 1) disposed transversely of said frame at the rear part thereof. The crank wheel 45 and its associated parts constitute a control means for the other mechanisms of the device as will be explained.

A spring barrel 48 fast on the crank wheel shaft carries a clock spring 49 (Fig. 3) having its outer end fast to the barrel and its inner end secured fast to a winding beveled gear 50 loosely mounted on said crank wheel shaft and engaged by a gear 51 fast on a diagonal shaft 52 rotated as will be explained, whereby said spring is kept tensioned for rotating said crank wheel for moving said clutch sleeve 40 from one position to the other.

A stop pin 55 on the inner face of said crank wheel near the periphery thereof, is disposed in lowest position when said clutch sleeve is in neutral position. A yieldably upwardly raised releasing lever 56 pivoted to a bracket 57 at the rear of the base and yieldably raised by the spring 58 projects at the forward end of the base and is provided near its rear end with a notch 59 forming a rearwardly faced shoulder 60 engaging said stop pin to hold the crank wheel against movement by said spring in the barrel 48.

An armature 62 pivoted at its upper end on a plate 63 mounted on the side of said standard has its lower end downwardly disposed in position normally to engage said stop pin 55, after the stop pin has been released from said shoulder, to stop said crank wheel with the clutch sleeve 40 in engagement with the raising pinion 35, whereby the drive pinion drives the worm shaft in the direction for raising the test piece to the testing point 16.

An extension 65 on the upper end of said pressure rod 15 is provided at the upper end with a transverse knife edge 66 engaging a minor load lever 67 fulcrumed at its inner end on a bracket arm 68 and carrying a minor load weight 69 on its outer end. While I show and describe a weight 69 for the minor load rather than a spring, it is noted that the invention is not thus limited.

An indicator 70 mounted on the front end of said arm 13 is provided with an upwardly projecting plunger 71 engaging over said minor load lever whereby when the test piece is raised to press against the testing point 16 the needle of the indicator is moved. The bezel 72 of said indicator being manually rotatable, carrying the dial and scale of the indicator, whereby the needle may be zeroized by rotating the scale when the needle is thus moved by the test piece.

A contact plate 75 mounted on the top face of the minor load lever 67 is adapted to engage a contact screw 76, adjustably disposed in the bracket 68, whenever the test piece raises the lever 67 thereby completing a circuit comprising a source of current 78, an electromagnet 80 on said magnet plate 63, and conductors 81, 82 and 83 connecting said contact plate, contact screw, source and magnet in series, whereby when said minor load is raised to its limit the crank wheel is released, and withdraws the clutch sleeve from the pinion 35, leaving the test piece and minor load raised.

A double faced escapement pawl 85 pivoted to a bracket 86 on the rear end of the base is provided with a pair of laterally turned upper and lower vertical stop plates 87 and 88 offset from each other both vertically and horizontally, and normally disposed in position for the upper stop plate 87 to engage said stop pin 55 after it leaves the armature 62, thus to stop the crank wheel in a second position to hold the clutch sleeve in neutral position, in which second position, an actuating pin 90 on the back of said crank wheel nearer the center thereof than said stop pin but more projected than the stop pin, engages a cammed end 91 of a clutch lever 92 intermediately fulcrumed as at 93 on said standard, and held with the cammed end down by the spring 94.

A vertical worm shaft 95 rotatably mounted in bearing brackets 96 and 97 on the side of said frame and projecting above the frame, is alined with a vertical clutch shaft 98 rotating in a bearing 99 beneath the vertical worm shaft and provided with a castellated wheel 100 on its upper end and a beveled pinion 101 on its lower end always in mesh with said driving beveled gear 27. A single throw clutch collar 103 slidably mounted on the lower end of said vertical shaft and constrained to rotate therewith is provided with lower teeth adapted to mesh with said castellated wheel when the collar is lowered. A yoke 105 on said clutch lever provided with inwardly disposed rollers engageable in an annular groove 107 on the clutch collar, whereby when said pin 55 is stopped in uppermost position by the plate 87, said pin 90 raises the cam end 91 and lowers said clutch collar and operatively connects said vertical shaft 95 with said driving gear thereby to rotate said shaft.

A vertical worm 110 on the upper end of said vertical shaft meshes with a worm wheel 111 mounted on a cam shaft 112 mounted for rotation across the upper face of said arm 13. A major load lever 114 fulcrumed at one end on a bracket 115 on said arm 13 is provided intermediately with a roller 116 resting on an eccentric major load cam 117 fast on said cam shaft 112. The outer end of the lever 114 carries a large major load weight 118. A power lever 120 fulcrumed on a knife edge bearing 121 on the side of said arm 13 near the pressure rod 15 has its free end connected by a link 122 to said major load lever near the fulcrum end thereof and is provided on the lower face with a bearing 123 adapted to engage a transverse knife edge 124 carried by the pressure rod. Said bearing 123 is adapted to rest on said knife edge only when said cam 117 and worm wheel are rotated a half turn, from the position of Fig. 2, by said vertical shaft when the latter is operatively connected to the driving gear.

A spiral stop cam 130 on said cam shaft engages a laterally turned end 131 of a pawl actuating lever 132 intermediately fulcrumed on the frame and connected by a link 133 with said escapement pawl 85 whereby said escapement pawl is raised and lowered during a revolution of the cam shaft thereby to disengage said upper stop plate 87 from the stop pin 55 to permit the stop pin to pass to the lower stop plate 88 and then as the pawl is lowered by the spring 134′, as the laterally turned end passes the end shoulder 134 of the cam, to permit the stop pin to pass from the lower stop plate 88 under the action of the clock spring carrying the clutch collar 103 out of mesh with the collar 100, leaving the major load raised, and carrying the clutch sleeve into mesh with the pinion 36 for lowering the anvil.

Winding mitre gears 135, 136 (Fig. 1) are carried by said diagonal shaft 52 and cam shaft 112 respectively, whereby said clock spring is wound one turn for each turn of the cam shaft thereby to retain the spring under tension.

A reverse pawl lever 140 fulcrumed on said bracket 57 is provided with upturned arm 141 having a laterally turned end 142 adapted to be engaged by said stop pin 55 after the stop pin leaves the escapement pawl, thereby to stop the crank wheel in reverse position with the horizontal clutch sleeve 40 engaged with the reverse pinion 36 thereby to lower the elevating screw. A reverse pin 143 vertically slidable in a fixed sleeve 144 on the frame engages the free end of said reverse lever 140; and a reverse stop 145 (Fig. 1) having a collar 146 vertically adjustably received on said elevating screw and a lateral arm 147 resting on said reverse pin is engaged by said anvil 21 as the anvil is lowered, thereby to depress the lever against the spring 148 and move said laterally turned end 142 out of the path of the stop pin 55 thereby to permit the stop pin to pass into engagement with said shoulder 60, thereby to move the horizontal clutch sleeve 40 to neutral position.

The operation is as follows:

The operator places test piece 22 upon the anvil and lowers the release lever 56 to release the crank wheel stop pin 55. This permits the crank wheel 45 to turn one quarter revolution and stop when the pin reaches the armature 62, crank wheel having thrust the crank forward and caused the clutch sleeve 40 to engage with bevel pinion 25. This operates through the worm shaft 28 and worm 31 to turn the worm wheel 23 to raise the elevating screw 20, bringing the test piece 22 into contact with the pressure rod 15, which raises the minor load until the plate 75 on the minor load lever 67 makes contact with the contact screw 76, to close the electric circuit through the electromagnet 80. When this circuit is closed, the magnet draws the armature 62 from the pin 55 and releases the crank wheel which turns until stop pin 55 reaches the plate 87 of the double pawl. This throws the clutch sleeve 40 to neutral position and causes the clutch collar 103 to be moved by the lever 92 and into engagement with the wheel 100 by the action of the actuating pin 90 against the cammed end 91. The worm 110 now turns the worm wheel 111 and major load cam 117 causing the major load lever 112 to lower and pressure to be applied through the link 122 and the power lever 120 to the pressure rod 15 and the test piece 16, causing the point 16 to penetrate the test piece a distance depending upon the hardness of the latter. The continued revolution of the cam 117 raises the major load and removes the power lever from the pressure rod; and the hardness number is observed on the indicator 70, the hardness number being in reality a function of the linear measure of the increase in depth of penetration of the engagement device due to the increase in pressure brought about by the imposition of the major load. During the revolution of the cam 117 the cam 130 on the same shaft 112 has raised the lever 132 to let the stop pin 55 move from the plate 87 to the plate 88 of the double pawl 85 and at the completion of one revolution of this cam 130 the end 131 of the lever 132 drops at the shoulder 134 and releases stop pin 55 and allows crank wheel to go forward and stop with the pin on the end 142 of the reverse pawl or arm 141. This movement disengages the clutch collar 103 and engages the clutch sleeve 40 with pinion 36, rotating the worm shaft 28 and the worm 31. The elevating screw 20 is thus lowered until reverse stop arm 147 pushes down the reverse pin 143 and through the lever 140 releases the crank wheel stop pin 55 from the reverse pawl 141. The wheel 45 then makes the last quarter turn and the pin 55 comes to rest on the shoulder 60 of the release lever 56 with the sleeve 40 in the neutral position, ready to go through the same cycle again. The machine is driven by a motor or line shaft and belt engaging the pulley 26 on the shaft 25 to which is fastened the driving gear 27 which runs continuously, and is continuously engaged with the pinions 35 and 36. The crank wheel 45 is yieldably driven through crank wheel shaft by the clock spring in the barrel 48. This clock spring is wound up one revolution for every revolution of crank wheel 45 by the gears 55, 51, 135, 136 and the shaft 52 from the shaft 112 during its revolution in lowering and raising major load.

While the electric circuit 78, 83, 80, 82, 75, 76, 81 is normally open so that the control means operates on the more economical open circuit rather than a closed circuit, it is noted that the invention is not so limited.

Figure 6:
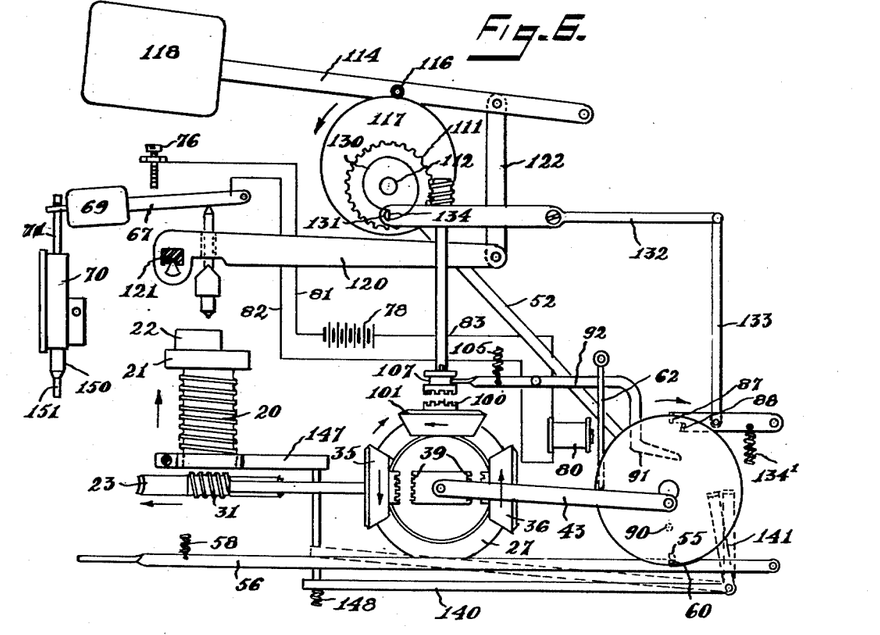
Fig. 6 is a somewhat diagrammatic side elevation showing the assembled machine.

A sleeve 150 (Fig. 6) fixed in the lower part of the indicator 70 receives the plunger 71 which is extended through the lower part of the indicator and has thereon a set mark 151 which should be disposed just at the lower edge of the sleeve when the plunger is raised the proper amount by the minor load lever. This is easily accomplished merely by raising the anvil with a test piece thereon until the mark 151 is even with the lower edge of the sleeve, and then adjusting the contact screw 76 just to touch the contact plate 75. As the collar 146 may be secured at different positions of adjustment up and down the screw 20, the arm 147 may be so located that it engages the pin 143 as soon as the test piece is sufficiently lowered to permit its easy removal. Thus it is not necessary that time be consumed in lowering the anvil 22 to near its lower limit when the pieces being tested are small. If the pieces are large, the collar 146 may be clamped near the anvil.

I claim as my invention:

1. In combination, an engagement device; a test piece support; mechanism for moving said support toward or from said device; an indicator connected to said device; a control means for causing said mechanism to move the support toward the device; means actuated by the movement of said device to cause said control means to stop said mechanism; a major load; and means set in operation by said control means when said mechanism is thus stopped to cause said major load to press upon said device and then to cause said mechanism to move the support away from said device.

2. In combination, a pressure device; a support mechanism for automatically moving said support toward said device, causing it to pause, then moving it from the device; a minor load pressing on said device; an indicator for ascertaining movement of said device; a major load; and means for automatically pressing said major load on said device during the pause and then removing it.

3. In combination, a frame; a rod provided with a testing point and movably mounted on the frame; a movable support adapted to receive a test piece; a constantly rotating member; raising and restoring mechanism for said support; clutch means for connecting either of said mechanisms to the support; a yieldably rotated wheel connected to said clutch means for moving the latter to raising, restoring or neutral position; a stop pin on the wheel; a releasing lever engaging said pin when said clutch means is in neutral position; means for stopping said stop pin with the clutch means in raising position when the test reaches said point; and means for releasing said stop pin to permit said wheel to move to restoring position.

4. In combination, a pressure rod provided with an engagement device; a support; mechanism for moving said support toward or from said device; a minor load resting on said pressure rod; an indicator for ascertaining movement of said device; a cam shaft; means for rotating the cam shaft; a major load cam fast on said cam shaft; a weighted major load lever resting on said cam; and a power lever connected to said major load lever and adapted to press on the pressure rod when said load cam is rotated.

5. In combination, an engagement device; a support; mechanism for moving said support toward or from said device; a minor load connected to said device; an indicator for ascertaining movement of said device; a control means for causing said mechanism to move the support toward the device; electromagnetic means including a circuit closed by the movement of the load to cause said control means to disable said mechanism; a major load; means set in operation by said control means when said mechanism is thus disabled to cause said major load to press on said device and then to be removed therefrom and to cause said control means to cause said mechanism to move the support away from the device; and means actuated on restoration of the support to cause said control means to disable said mechanism.

6. In combination, a movable engagement device; a support; mechanism for moving said support toward or from said device; a control means for causing said mechanism to move the support toward the device; and means actuated by the movement of the device to cause said control means to disable said mechanism.

7. In combination, an engagement device; a support; power driven mechanism for causing relative movement between said support and device; means including a yieldably rotated member connected to said mechanism for causing either movement; a stop pin thereon; stop means to stop said pin with the member in positions to move the support toward and from said device and to disable the mechanism; a reverse lever adapted to be engaged by said pin to hold said member in restoring position; and means actuated when said support is restored to move said reverse lever to permit the stop pin to pass to disabling position.

8. In combination, a frame; a pressure rod provided with a testing point; a movable support adapted to receive a test piece; a constantly rotating member; raising and restoring mechanism for said support; clutch means for connecting either of said mechanisms to the support; a yieldably rotated wheel connected to said clutch means for moving the latter to raising, restoring or neutral position; a stop pin on the wheel; and a plurality of stop means for engaging said pin to stop said wheel with the clutch means in said positions.

9. In combination, a movable engagement device; an anvil; mechanism for moving said anvil toward or from said device; control means including a yieldably rotated member connected to said mechanism for causing either movement; a cam shaft; means set in operation by said control means for rotating the cam shaft one revolution; a load cam fast on said cam shaft; a weighted major load lever resting on said cam; a power lever connected to said major load lever and adapted to press on the device when said load cam is rotated; a spring for rotating said yieldably rotated member; and a connection between said cam shaft and spring for keeping the spring wound up.

10. In combination, an engagement device; an anvil; mechanism for moving said anvil toward or from said device; means including a yieldably rotated member connected to said mechanism for causing movement in either direction; a releasing means to stop said member in position to disable said mechanism; stop means to stop said member in position to move the anvil toward said device; a minor load pressing on said device; an indicator for ascertaining movement of said device; means actuated by the rising of the load to disable the stop means; an escapement means to stop said member opposite the releasing means in position to disable said mechanism; a load cam; means set in operation by said member when stopped by the escapement means to rotate said cam; a major lead held by said cam away from said device and permitted to press on said device by the rotation of said load cam; means actuated by the rotation of the cam to cause said escapement means to permit the member to rotate; and a reverse stop adapted to stop said member in restoring position.

11. In combination, an engagement device; a test piece support; mechanism for causing relative movement of said support and device toward or from each other; an indicator connected to said device; a control means for causing said mechanism to cause relative movement of the support and device toward each other; means actuated by the movement of said device to cause said control means to stop said mechanism; a major load; and means set in operation by said control means when said mechanism is thus stopped to cause said major load to press upon said device and then to cause said mechanism to cause relative movement of the support and device away from each other.

12. In combination, a pressure device; a support; mechanism for automatically causing relative movement of said support and device toward each other, causing a pause in said movement, then a relative movement of the device and support away from each other; a minor load pressing on said device; an indicator for ascertaining movement of said device; a major load; and means for automatically pressing said major load on said device during the pause.

13. In combination, an engagement device; a support; mechanism for automatically causing relative movement of said support and device toward each other, causing a pause in said movement, then a relative movement of the device and support away from each other; and means actuated by the completion of said last named movement to cause said mechanism to be disabled.

14. In combination, an engagement device; a support; mechanism for automatically causing relative movement of said support and device toward and from each other; and means for automatically pressing on said device and increasing the pressure a predetermined amount between said movements.

15. In combination, an engagement device; a support; mechanism for automatically causing relative movement of said support and device toward and from each other; a minor load adapted to be applied to said device between said movements; a major load; and means for automatically applying the major load to said device between said movements and while the minor load is applied.

16. In combination, an engagement device; a support; mechanism for automatically moving said support toward said device, causing it to pause and then moving it from said device; a minor load adapted to be applied to said device during said pause; a major load; and means for automatically applying the major load to said device during said pause and while the minor load is applied.

17. In combination, a penetrating member; a support; mechanism for automatically moving said support toward said penetrator, causing it to pause, then moving it from the penetrator, and means actuated by the restoration of said support to cause said mechanism to be disabled.

18. In a machine for testing the hardness of metals, the combination of a pressure testing member adapted to receive a penetrating test point; a support adapted to receive a test specimen; means for automatically bringing said penetrator and said test specimen into testing relation under an initial, minor, predetermined load; means to automatically increase the pressure of said testing relation to a second major predetermined load; means for automatically decreasing the pressure of said testing relation to the said minor load pressure, and means to read the linear measurement of the increment in depth of impression due to said increment from minor to major load.

19. In a machine for testing the hardness of metals, the combination of a pressure testing member adapted to receive a penetrating test point; a support adapted to receive a test specimen; means for automatically bringing said penetrator and said test specimen into testing relation under an initial, minor, predetermined load; means to automatically increase the pressure of said testing relation to a second major predetermined load; means for automatically decreasing the pressure of said testing relation to the said minor load pressure, means to read the linear measurement of the increment in depth of impression due to said increment from minor to major load and means to automatically disengage said penetrator from said test piece, thereby restoring the machine to adaptability for receiving a new test piece.

20. In an apparatus for testing hardness, the combination of an engagement member adapted to be brought into testing relation with a work member to be tested; means for automatically applying a predetermined load to one of said members, substantially as said relation is effected, for causing one of the members to engage the other; means set in operation by said engagement for automatically applying a predetermined second load to one of the members, after they are thus engaged, to cause additional relative movement between said members; and means for indicating hardness from the amount of the said movement.

21. In an apparatus for testing, the combination of an engagement member adapted to be brought into testing relation with a work member to be tested; means for automatically applying a minor load to one of said members, substantially as said relation has been established, for causing one of the members to engage the other; means set in operation by said engagement for automatically applying a major load to one of the members independently of the minor load, after said members are thus engaged, to cause additional relative movement between said members; and means for indicating hardness from the amount of the said movement.

22. In an apparatus for testing, the combination of an engagement member adapted to be brought into testing relation with a work member to be tested; means for automatically applying a minor load to one of said members, substantially as said relation is established, for causing one of the members to engage the other; means set in operation by said engagement for automatically applying a major load to one of the members, after the application of the minor load and before its removal, to cause additional relative movement between said members; and means for indicating hardness from the amount of the said movement.

23. In an apparatus for testing the hardness of a work member, the combination of an engagement member; means for automatically bringing said members into testing relation with each other; means set in operation by the establishment of said relation for automatically applying a load to one of said members, after said relation has been established, for causing one of the members to engage the other; means set in operation by said engagement for automatically applying a second load to one of the members, after the members are thus engaged, to cause additional relative movement between said members; and means for indicating hardness from the amount of the said movement.

24. In a hardness testing apparatus, the combination of a work-piece supporting member; an engagement member, one of said members being movable toward or from the other; means for relatively moving said members one toward the other at a predetermined speed, causing the engagement member to engage and press upon the work piece; means automatically set in operation by the engagement stopping the relative movement after said engagement; and means for causing the engagement member to test the hardness of said work piece.

25. In a hardness testing apparatus the combination of a work-piece supporting member; an engagement member, one of said members being movable toward or from the other; means for relatively moving said members one toward the other; means for applying a minor load to one of said members for causing the engagement member to engage and press upon the work piece; means set in operation by the engagement for automatically applying a major load to one of the members while the minor load is applied, to cause relative movement of said members one toward the other; and means for indicating a function of the amount of the said movement.

26. In a hardness testing apparatus the combination of a work-piece supporting member; an engagement member, one of said members being movable toward or from the other; means for relatively moving said members one toward the other and causing the members to pause; means for automatically applying a minor load to one of said members, during the pause, for causing the engagement member to engage and press upon the work piece; means set in operation by the engagement for automatically applying a major load to one of the members, while the minor load is applied, to cause relative movement of said members one toward the other; and means for indicating hardness from the amount of the said movement.

27. In an apparatus for testing the hardness, the combination of an engagement member; means for applying said member to a work-member to be tested; a major load adapted to press on said members together to cause relative movement; an indicator for indicating the limits of said movement; means automatically set in operation substantially as said engagement member is applied to hold the major load against application for an extended period and then to apply the major load during a succeeding extended period.

28. A hardness testing method comprising bringing an engagement member and a work member into testing relation with each other; applying a load to one of said members, after said relation has been established, for causing one of the members to press upon the other for an extended predetermined length of time indicating the relative position of said members during said time; applying a second load to one of the members for an extended predetermined period during said time and after the position has been indicated, to cause movement between said members; removing said second load after the lapse of said period; and then indicating a function of the amount of the said movement.

29. A hardness testing method comprising bringing an engagement member and a work-member into testing relation with each other; applying a load to one of said members after said relation is established, for causing one of the members to press upon each other and to pause while thus pressed upon; indicating the relative position of said members during said pause; applying a second load to one of the members for an extended accurately predetermined period after the position has been indicated to cause movement between said members; removing said second load after said period; and then determining the hardness from said movement.

30. In a hardness testing apparatus, the combination of a work-piece supporting member; an engagement member, one of said members being movable toward or from the other; means for relatively moving said members one toward the other; means for gradually applying a minor load to one of said members at uniform speed for causing the engagement member to press upon the work piece, means for automatically applying a major load to one of the members, after the minor load is applied, to cause relative movement of said members one toward the other; and means for indicating a function of the amount of the said movement.

31. In a hardness testing apparatus, the combination of a work-piece supporting member and an engagement member relatively movable one toward and from the other; means for moving said members one toward the other into testing relation; means for gradually applying at a predetermined speed for a uniform length of time an accurately predetermined minor load to one of said members, after said relation has been established, for causing the engagement member to press upon the work piece; means for gradually applying at a predetermined speed and for a predetermined length of time a major load of predetermined pressure to one of the members, after said work piece is thus pressed upon, to cause relative movement of said members one toward the other; and means for indicating a function of the amount of the said movement.

32. In a hardness testing apparatus, the combination of a work-piece supporting member and an engagement member relatively movable one toward and from the other; means for relatively moving said members one toward the other at a predetermined speed; means for applying for a uniform length of time an accurately predetermined minor load to one of said members for causing the engagement member to press upon the work piece; means for gradually applying at a predetermined speed and for a predetermined length of time a major load of predetermined pressure to one of the members to cause relative movement of said members one toward the other; and means for indicating a function of the amount of the said movement.

33. In a hardness testing apparatus, the combination of a work-piece supporting member and an engagement member relatively movable one toward and from the other; means for gradually relatively moving said members one toward the other at a predetermined speed into testing relation; means for automatically applying for a predetermined length of time an accurately predetermined minor load of pressure to one of said members after said relation has been established for causing the engagement member to press upon the work piece to cause an initial relative movement between said members; means for automatically gradually applying at a predetermined speed and for a predetermined length of time a major load of predetermined pressure to one of the members, only after said initial movement has ceased, to cause relative movement of said members one toward the other, and automatically removing the major load after it has acted said predetermined length of time; means for indicating a function of the amount of the said movement after the removal and means for automatically causing the final separation of said members after said function is indicated.

34. A hardness testing method for testing the hardness of a plurality of similar work members, said method comprising; relatively moving a work member and an engagement member one toward the other at a predetermined speed; applying for a predetermined length of time a minor load of predetermined pressure to one of said members for causing the engagement member to press the work member a predetermined length of time; applying at a predetermined speed and for a predetermined length of time a major load of predetermined pressure to one of the members to cause relative movement of said members one toward the other; and indicating a function of the amount of said movement; corresponding predetermined pressures and lengths of time being the same for each test.

35. A hardness-testing method comprising relatively moving a work member and an engagement member one toward the other into testing relation; applying for a predetermined length of time a minor load of predetermined constant value to one of said members, after said relation has been established, for causing the engagement member to press the work member; gradually applying at a predetermined speed and for a predetermined length of time a major load of predetermined pressure to one of the members, after said first named length of time has elapsed, to cause relative movement of said members one toward the other; and indicating a function of the amount of said movement.

36. A hardness-testing method comprising automatically gradually relatively moving a work member to be tested and an engagement member one toward the other into testing relation; applying for a uniform length of time a predetermined minor load of constant value to one of said members, after said relation is established, for causing the engagement member to press the work member with a predetermined pressure a predetermined length of time; gradually applying at a predetermined speed and for a predetermined length of time a major load of predetermined pressure to one of the members after said first named length of time has elapsed to cause relative movement between said members one toward the other; removing the major load after said second named length of time has elapsed; indicating a function of the amount of said movement after the removal of the major load; and causing the separation of said members after said function is indicated.

37. In a hardness testing apparatus, the combination of means for causing relative movement for bringing an engagement member and a work-member into testing relation at a predetermined speed; means for automatically stopping said movement substantially as said relation is established; and means co-operating with said engagement member and set in operation by said stopping for automatically testing the hardness of the work-member when said movement is thus stopped.

38. In a hardness testing apparatus, the combination of power operated means for causing relative movement for bringing an engagement member and a work-member into testing engagement at a predetermined speed; means for automatically stopping said movement substantially as said engagement takes place; and means co-operating with said engagement member for testing the hardness of the work-member when said movement is thus stopped.

39. In a hardness testing apparatus, the combination of means for causing relative movement for bringing an engagement member and a work-member into testing engagement; means controlled by said engagement for automatically stopping said movement substantially as said engagement takes place; and means co-operating with said engagement member for testing the hardness of the work-member when said movement is thus stopped.

40. In a hardness testing apparatus, the combination of means for causing relative movement for bringing an engagement member and a work-member into testing engagement at a predetermined speed; and means set in operation by said engagement and co-operating with said engagement member for automatically testing the hardness of the work-member when said engagement is thus effected.

41. In a hardness testing apparatus, the combination of means for causing relative movement for bringing an engagement member and a work-member to be tested into testing engagement with each other at a predetermined speed; means set in operation by said engagement for automatically applying a minor load of predetermined pressure to one of said members after said engagement and stopping said movement, for causing the engagement member to press the work member; means for automatically applying a major load of predetermined pressure at a predetermined speed and for a predetermined length of time to one of said members a predetermined length of time as soon as the minor load has been applied a predetermined length of time to cause relative movement of said members toward each other and then removing the major load; and entirely mechanical means for interpreting said last named movement in terms of hardness.

42. In a hardness testing apparatus, the combination of means for causing relative movement for bringing an engagement member and a work-member to be tested into testing engagement with each other at predetermined speed; means set in operation by said engagement for automatically stopping said movement after said engagement and applying a minor load to one of said members for causing the engagement member to press the work member; and means for applying a major load of predetermined pressure after the minor load is applied to cause relative movement of said members toward each other; and mechanical means controlled by said last named movement for multiplying this movement and interpreting it in terms of hardness.

43. In a hardness testing apparatus, an engagement member; means for bringing about testing relation between said member and a work member to be tested and causing the members to engage each other; means for automatically applying pressure to one of the members substantially as said relation is established; to cause relative movement therebetween; means for applying a predetermined additional pressure to one of said members to cause further relative movement therebetween; and means for indicating the hardness from the amount of the said further movement.

44. In a testing apparatus, the combination of an engagement member; means for bringing said member and a work member into testing relation with each other, automatically causing one of the members to engage the other; means for automatically applying a load to one of the members, substantially as they are thus engaged; means for applying an additional load to cause additional relative movement between said members; and means for determining a function of the amount of the said additional relative movement.

Signed at New York, in the county of Bronx and State of New York, this ninth day of August, A. D. 1926.

CHARLES H. WILSON.